United States Patent
Odaira

(10) Patent No.: US 10,318,867 B2
(45) Date of Patent: Jun. 11, 2019

(54) HIGH-LEVEL OPTIMIZATION OF MATHEMATICAL PROGRAMS BASED ON INDUCTIVE INFERENCE FROM EXECUTION TRACES

(71) Applicant: INTERNATIONAL BUSINESS MACHINES CORPORATION, Armonk, NY (US)

(72) Inventor: Rei Odaira, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 14/838,607

(22) Filed: Aug. 28, 2015

(65) Prior Publication Data
US 2017/0061292 A1 Mar. 2, 2017

(51) Int. Cl.
G06N 5/04 (2006.01)
G06N 5/00 (2006.01)

(52) U.S. Cl.
CPC .................... G06N 5/006 (2013.01)

(58) Field of Classification Search
CPC ........................................................ G06N 5/04
USPC ......................................................... 717/140
See application file for complete search history.

(56) References Cited

U.S. PATENT DOCUMENTS

| 8,719,796 B2 | 5/2014 | Rosu et al. |
| 8,997,057 B1 | 3/2015 | Diwan et al. |
| 9,792,161 B2 * | 10/2017 | Huang .................... G06F 9/524 |

OTHER PUBLICATIONS

Gao, X. et al., "SOAP: Structural Optimization of Arithmetic Expressions for High-Level Synthesis," International Conference on Field-Programmable Technology (FPT), Dec. 2013. (pp. 1-8).
Gulwani, S. et al., "Synthesis of Loop-free Programs," Proceedings of the 32nd ACM SIGPLAN Conference on Programming Language Design and Implementation, Jun. 2011. (pp. 1-12).
Jha, S. et al., "Oracle-Guided Component-Based Program Synthesis," Proceedings of the 32nd ACM/IEEE International Conference on Software Engineering (ICSE), May 2010. (pp. 1-10).

* cited by examiner

*Primary Examiner* — John Q Chavis
(74) *Attorney, Agent, or Firm* — Tutunjian & Bitetto, P.C.; Vazken Alexanian

(57) ABSTRACT

A method for optimization of a program stored in non-transitory storage media includes generating traces for a programmed formula using a hardware processing system and selecting a subset of the traces. One or more substitute formulae are inferred from a plurality of formulae that yield a similar set of traces to the subset of traces. The programmed formula is transformed with a best matched substitute formula to reduce computational complexity.

20 Claims, 3 Drawing Sheets

US 10,318,867 B2

HIGH-LEVEL OPTIMIZATION OF MATHEMATICAL PROGRAMS BASED ON INDUCTIVE INFERENCE FROM EXECUTION TRACES

BACKGROUND

Technical Field

The present invention relates to program optimization, and more particularly to systems and methods for using traces to inductively infer substitute program elements to reduce computational complexity.

Description of the Related Art

Program optimization can be considered a process to transform a program by applying prepared rules. For example, in peephole optimization, rules such as: "$x*=2 \rightarrow x<<=1$", can be prepared, and an entire program can be scanned to apply the rules where applicable. However, to perform higher-level optimizations, the combination of rule applications causes the computation to explode. The problem is not only in the large number of rules, but also it is necessary to apply multiple rules. This is why searching is necessary, but the searching results in combinatorial explosion. Heuristics do not work well, because each rule by itself does not speed up the program, so it is difficult to decide on a search direction in the search space.

SUMMARY

A method for optimization of a program stored in non-transitory storage media includes generating traces for a programmed formula using a hardware processing system and selecting a subset of the traces. One or more substitute formulae are inferred from a plurality of formulae that yield a similar set of traces to the subset of traces. The programmed formula is transformed with a best matched substitute formula to reduce computational complexity.

A hardware processing system configured to reduce computation complexity of a programmed formula stored in non-transitory storage media includes a processor configured to generate a selection of traces for a programmed formula. An inferring device is coupled to the processor to search for one or more substitute formulae from a plurality of stored formulae to determine a similar set of traces to the selection of traces. A transformed program is generated using the processor that matches the programmed formula with a best matched substitute formula to reduce computational complexity.

A non-transitory computer readable storage medium comprising a computer readable program for optimization of a formula in a program, wherein the computer readable program when executed on a computer causes the computer to perform the steps of generating traces for a programmed formula using a hardware processing system; selecting a subset of the traces; inferring one or more substitute formulae from a plurality of formulae that yields a similar set of traces to the subset of traces; and transforming the programmed formula with a best matched substitute formula to reduce computational complexity.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
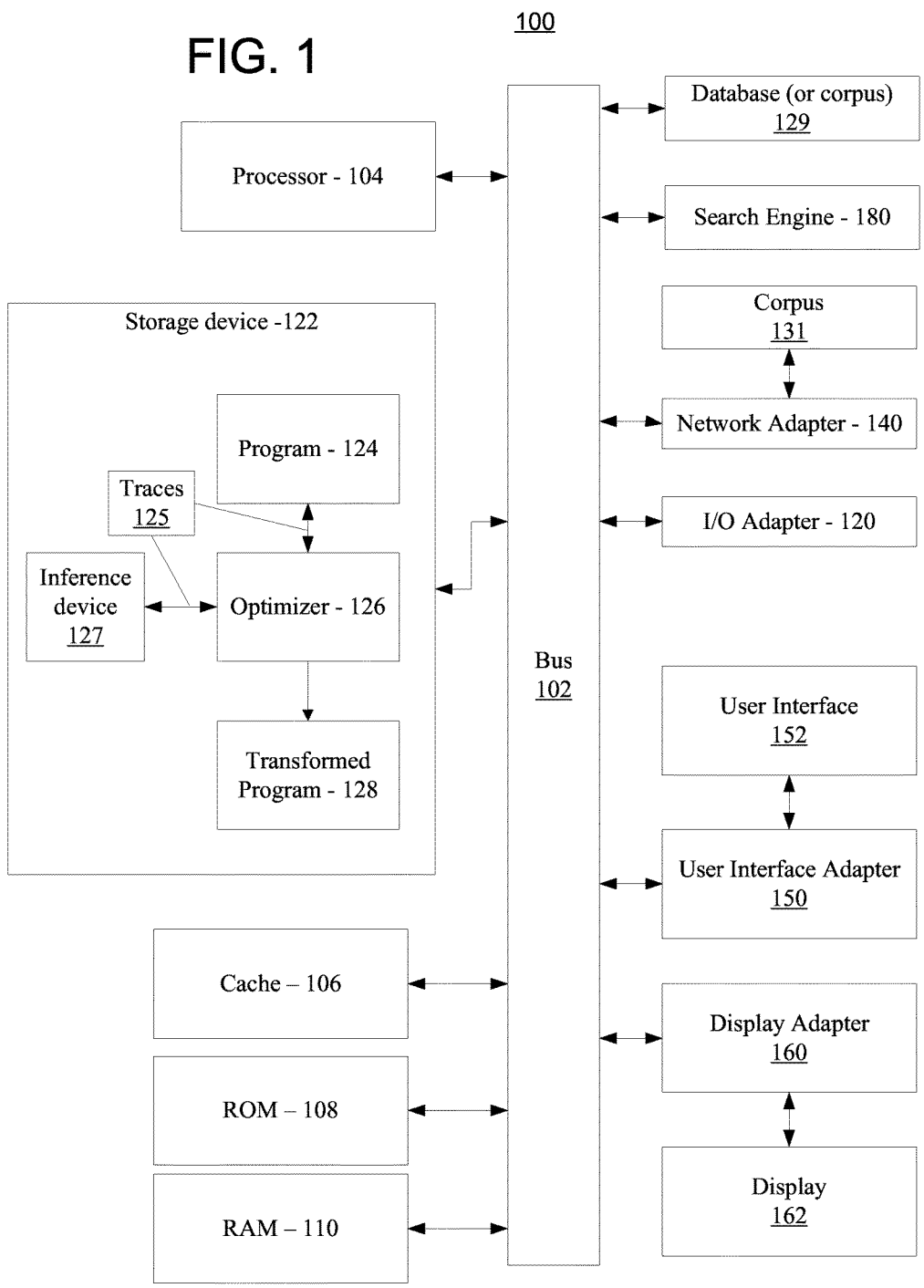
FIG. 1 is a block/flow diagram of a system/method for optimizing a formula in a stored program in accordance with the present principles.

In accordance with the present principles, systems and methods provide search clues for program optimization. The present principles search for candidate programs from a given mathematical program before optimization. The search that is conducted is influenced by traces computed for portions of the original program. These traces are employed to assist in the search to match for equivalent substitutes that will reduce computational complexity. The program can be transformed to become more efficient. Suppose that an optimized program is given after being transformed. A verification is needed to determine whether the program is equivalent before and after the transformation, by a verification method. The verification method is also a difficult problem that needs to be solved. However, verification problems have been studied broadly in the fields of automatic theorem proving and program verification. It is easier to employ verification information (in that a search target is given) than to perform a search by blind searching. The present principles aim at obtaining candidate programs after optimization from a given mathematical program before optimization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be understood that when an element s is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Referring now to the drawings in which like numerals represent the same or similar elements and initially to FIG. 1, a block/flow diagram shows an exemplary processing system 100 for program optimization. The processing system 104 includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 140, a user interface adapter 150, and a display adapter 160 are operatively coupled to the system bus 102.

A user input device 152 may be operatively coupled to system bus 102 by the user interface adapter 150. The user input device(s) 152 can be any of a keyboard, a mouse, a keypad, an image capture device, a motion sensing device, a microphone, a device incorporating the functionality of at least two of the preceding devices, and so forth. Other types of input devices can also be employed, e.g., a touch screen display. The user input device 152 is employed to input and output information to and from system 100. A display 162 is coupled to the display adapter 160.

A first storage device 122 is operatively coupled to system bus 102 (and may be coupled directly or through the I/O adapter 120). The storage device 122 can be any of a disk storage device (e.g., a magnetic or optical disk storage device), a solid state magnetic device, etc. The first storage device 122 stores one or more programs 124 that will be run on the system 100, The program 124 may be written in any suitable computer language, e.g., C, C++, etc. The program 124 is compiled and executed in whole or in part by an optimizer 126.

The optimizer 126 is configured to generate traces 125 from portions of the program 124 to provide search information to an inference device 127. The inference device 127 is configured to generate search queries based upon the traces 125. The inference device 127 may be configured to conduct the search or may communicate the queries to a search engine 180. The inference device 127 may create a trace or a subset of traces from the traces 125. The traces 125 may be employed to provide information to narrow the search needed to find substitute code or formulas for the running the program 124 more efficiently (e.g., less computationally complex or less cost). The search engine 180 may employ the traces 125 to identify candidate substitutions for portions of the program. The search may be conducted on a database 129 or may access a separate corpus 131 of formulas, etc.

Once a substitute or substitutes are identified, the optimizer 126 searches for a best candidate code or formula(s) to be are substituted in the program 124. The optimizer 126 can generate substitute code to provide a transformed or optimized program 128.

The search engine 180 may be included locally or may access wide area or global networks. The search engine 180 may be configured to focus on a particular subject or a particular area of endeavor. The search engine 180 may include a commercially available search engine or be a specially designed search engine.

The processing system 100 may include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
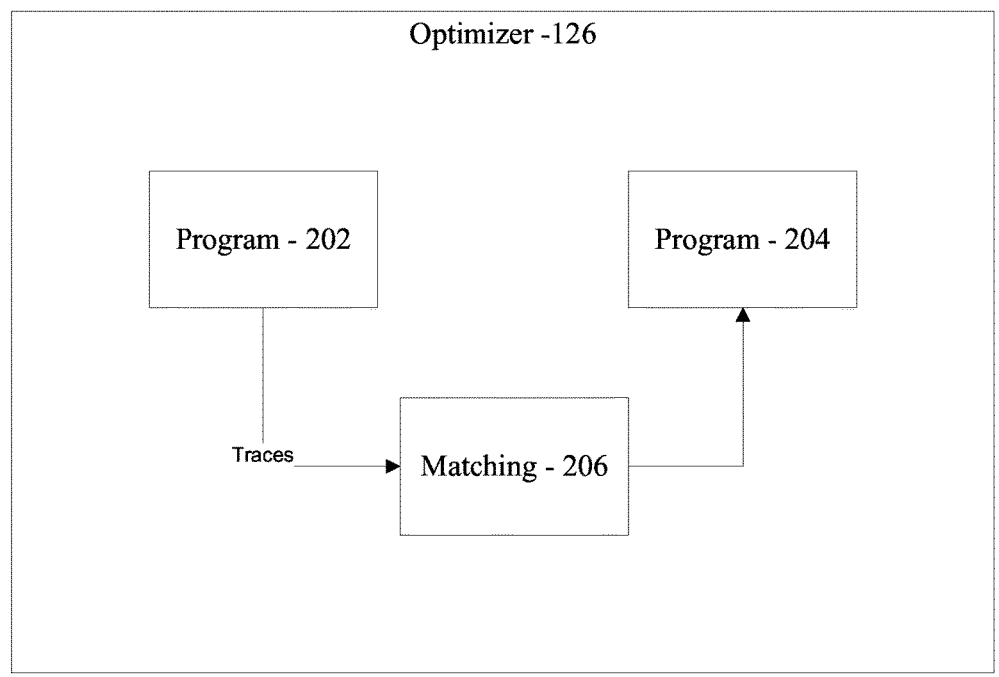
FIG. 2 is another block/flow diagram showing aspects of the system/method of FIG. 1 in accordance with the present principles.

Moreover, it is to be appreciated that system 200 described below with respect to FIG. 2 is a system for implementing respective embodiments of the present principles. Part or all of processing system 100 may be implemented in one or more of the elements of system 200.

Referring to FIG. 2, a program optimization is shown in greater detail. The program optimizer 126 may include a processor with memory and is employed to transform a program by matching program traces with prepared formulae instead of employing prepared rules. In one example, (Example 1) a program 202 computes a sum of all the multiples of 3 or 5 below 1000. A naive execution takes O(N) time, while after transformation in accordance with the present principles, a program 204 takes virtually O(1) time, using a substitute formula for summation of an arithmetic sequence.

The optimizer 126 generates traces on program 202 that assist in obtaining candidate programs from a given (mathematical) program.

EXAMPLE 1

Program 202 includes a formula: sum({x|(x % 3==0||x % 5==0) && natural(x) && x<N}). Traces can be computed for a given set of values of (different N's). Using these traces, a biased search can be performed. Through a search, the following formula is identified (program 204) by employing verification of traces between programs 202 and 204.

Program 204 becomes: sum({x|x % 3==0 && natural(x) && x<N})+sum({x|x % 5==0 && natural(x) && x<N})−sum({x|x % 15==0 && natural(x) && x<N}).

If one traces the execution of a mathematical program before optimization, one can sometimes find it easy to apply a known mathematical formula to the execution results (or to the states immediately before computing the results), even if the intermediate computation is complicated. In other words, to solve a mathematical problem, a guess can be made first by experimenting with small cases, before proving the guess is indeed true. The present principles trace the execution results or slices of the execution results by specifying various input values to a program before optimization, and then infer candidate programs after optimization by checking whether it is possible to reproduce the traces by a simple combination of known formulae.

So in Example 1, trace the slice immediately before computing sum( ), for example with N=50. This yields a trace: 3+5+6+9+10+12+15+18+20+21+24+25+27+30+33+35+36+39+40+42+45+48.

Then, check whether the formulae of the number series whose partial sum can be easily computed can generate the obtained trace, by matching the formulae with the trace. For example, prepare in advance the formula of the summation of arithmetic sequences, the formula of the summation of geometric sequences, etc. The matching does not need to be strict; partial matching suffices. In this example, first the arithmetic sequence with the initial term "3" and the common difference 3 partially matches the trace to provide formula (1). Next, a part of the arithmetic sequence with the initial term "5" and the common difference 5 matches the trace to provide formula (2). Finally, the arithmetic sequence with the initial term "15" and the common difference 15 matches the remaining trace to provide formula (3).

$$\text{sum}(\{x|3<=x\&\&x<50\&\&(x-3)\%3==0\}) \quad (1)$$

$$\text{sum}(\{x|5<=x\&\&x<50\&\&(x-5)\%5==0\}) \quad (2)$$

$$\text{sum}(\{x|15<=x\&\&x<50\&\&(x-15)\%15==0\}) \quad (3)$$

This results in a candidate formula:

$$\text{sum}(\{x|3<=x\&\&x<50\&\&(x-3)\%3==0\})+\text{sum}(\{x|5<=x\&\&x<50\&\&(x-5)\%5==0\})-\text{sum}(\{x|15<=x\&\&x<50\&\&(x-15)\%15==0\}) \quad (\text{EQ. 1})$$

As a result, the candidate program corresponding to program 204 is inferred. This process of matching 206 is a searching process based on traces. This searching discovers small combinations of formulae, each of which is known to simplify the computation. The present principles can take advantage of existing string matching algorithms and set cover algorithms.

Mathematical programs are employed in optimization problems, such as numerical computation, operations research, machine learning, etc. Increased computational speed is one important aspect for the mathematical programs. The previous example (Example 1) demonstrated a reduction in computational complexity; however the present principles are applicable in other aspects. For example, as described in Example 2 hereinafter, computations involving integer solutions of, e.g., $b/a \times (b-1)/(a-1)=\frac{1}{2}$ (Eq. 2) can be reduced.

EXAMPLE 2

It takes more than several hours for a naive program to compute the solutions of the formula: $b/a \times (b-1)/(a-1)=\frac{1}{2}$ (Eq. 2), when "a" is larger than N and N=1,000,000,000,000 (N=iteration counter). By transforming Eq. 2 to $(2a-1)^2-2(2b-1)^2=-1$, Pell's equation $X^2-2Y^2=-1$ can be applied, and the integer solutions of X and Y can be easily computed. However, since there are infinite ways to transform the equation, it is difficult to reach $(2a-1)^2-2(2b-1)^2=-1$ from $b/a \times (b-1)/(a-1)=\frac{1}{2}$ by searching.

In the meantime, by executing the naive program with small N's, the following sequence will be generated: (4, 3), (21, 15), (120, 85), . . . . This sequence can be obtained by a linear transformation (e.g., the transformation may include the operations of plus 1, followed by division by 2) of the following solution sequence is computed by Pell's equation: (7, 5), (41, 29), (239, 169), . . . . As a result, the present principles infer a candidate program after optimization, by using Pell's equation with X=2a−1 and Y=2b−1. To verify whether the inferred program is correct, it is sufficient to substitute X=2a−1 and Y=2b−1 for $X^2-2Y^2=-1$ and to check the equation after the substitution is equivalent to $b/a \times (b-1)/(a-1)=\frac{1}{2}$, by using a formula manipulation program.

In one embodiment, program 204 may be generated in accordance with the following matching/optimizing method (Method A) illustratively presented in pseudocode.

Method A:

```
optimize(prog_before : Program before optimization) : Program after optimization {
    for (depth = 0; depth < depth_threshold; depth++) {
        Traces = Empty set;
        prog_after = nil;
        for (N = N_start; N < N_threshold; N += N_increment) {
        Traces = Traces ∪ trace(prog_before, N, depth);
        Formulae = matching_formulae(Traces);
        prog_after = search_for_matching(Traces, Formulae);
        if (prog_after == nil)!
            break;
    }
        if (prog_after != nil)
        break;
    }
    return prog_after;
}
trace(prog_before : Program before optimization, N, depth) : Trace of program {
    Invoke prog_before with N as a parameter, and return a trace depending on depth.
    The bigger the depth, the more detailed the trace. For example, if depth==0, then return
    only the return value of the program. For instance, (21, 15) in Example 2.
    If depth==1, then return the slice immediately before computing the program return
    value. For instance, 3+5+6+9+10+12+15+... in Example 1.
}
matching_formulae(Traces) : Set of formulae {
    Return the set of the formulae that possibly match the given traces.
    In Example 1, return the set of the formulae of the sequences whose partial
    summations are known to be easily computed.
    In Example 2, return the set of the formulae that generate the sequence of integer
    pairs.
}
search_for_matching(Traces, Formulae) : Program after optimization {
    If a set of formulae in Formulae can cover Traces, then return a program
    consisting of the formulae. Otherwise, return nil.
}
```

In accordance with the present principles, mathematical formulae are considered as computation components. The present embodiments do not need to search all mathematical formulae. Instead by employing traces or traces of slices, the present embodiments search only a subset of the formulae. For example, in Example 1, only the formulae of the sequences whose partial summations are known to be easily computed are used. In other words, the present principles perform matching to sequences generated by formulae. The present principles generate an optimized program from the intermediate results of computations.

Figure 3:
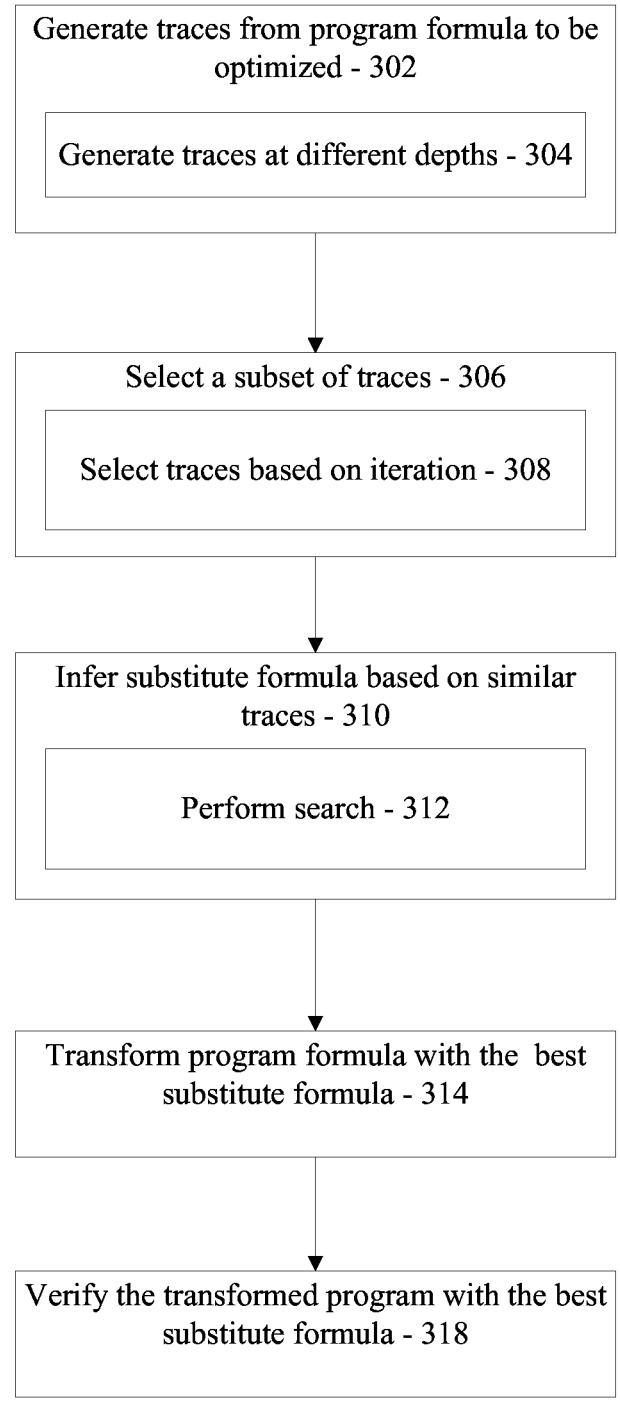
FIG. 3 is a block/flow diagram showing a system/method for optimizing a program in accordance with the present principles.

Referring to FIG. 3, a system/method for optimization of a program stored in non-transitory storage media is illustratively shown. In block 302, traces are generated for a programmed formula using a hardware processing system. Traces are generated by running the program and storing the output. It should be noted that the entire program need not be executed and portions of the program associated with a formula or portion of the program to be optimized only need to be executed. The traces may include a series of numbers, tuples, a group of numbers, etc. computed by the programmed formula.

In block 304, traces may be generated at different depths in the program where larger depths provide greater detail for the traces. The greater depth will be employed in matching operations to provide a more accurate result. Depth is known to those skilled in the art.

In block 306, a subset of the traces are selected. The selection process may be a random selection; however, selecting traces that are simpler, typical or known solutions are preferred. The number of traces selected will be dependent on the accuracy desired.

In block 308, the subset of the traces may be selected by employing an iteration counter N and selecting the subset of traces based on a plurality of values of N. For example, N's may be selected randomly, every $100^{th}$ N, every Z+40 N, etc.

In block 310, one or more substitute formulae are inferred from a plurality of formulae that yield a similar set of traces to the subset of traces. Similarity may be defined based on accuracy, type or other criteria related to the traces. The similarity may be based on a general trend of the traces, e.g., increasing in value, a same statistical distribution, etc. In block 312, the inferring may include searching a database or other corpus for replacement formulas based on the subset of traces. The search will be performed in accordance with the selected depth.

In block 314, the programmed formula is transformed with a best matched substitute formula to reduce computational complexity. This may include substituted computer code, altering the programmed formula, substituting a formula and adding operations, etc. The best match depends on the accuracy (similarity) desired. The inductive inference may need exact similarity or may need a simple trend. The inference or search may result in multiple results. The most accurate substitute or the formula meeting the particular criteria may be selected as the best match.

In block 316, transforming the programmed formula with the best matched substitute formula may include conducting one or more mathematical operations on the best matched substitute formula to match the programmed formula. For example, the substitute formula may need to be reduced or increased using an additional mathematical operation to provide the desired similarity with the programmed formula.

In block 318, a verification process may be performed to verify that the best matched substitute formula matches the programmed formula.

Having described preferred embodiments for high-level optimization of mathematical programs based on inductive inference from execution traces (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for optimization of a program stored in non-transitory storage media, comprising:
   generating traces for a programmed formula using a hardware processing system;
   selecting a subset of the traces;
   inferring one or more substitute formulae from a plurality of formulae that yield a similar set of traces to the subset of traces; and
   transforming the program by replacing the programmed formula with a best matched substitute formula in the program to reduce computational complexity.

2. The method as recited in claim 1, wherein generating traces includes generating traces at different depths where larger depth provides greater detail for the traces.

3. The method as recited in claim 1, wherein selecting the subset of the traces includes:
   employing an iteration counter N; and
   selecting the subset of traces based on a plurality of values of N.

4. The method as recited in claim 1, wherein the traces include a series of numbers or a group of numbers computed by the programmed formula.

5. The method as recited in claim 1, wherein transforming the programmed formula with the best matched substitute formula includes conducting one or more mathematical operations on the best matched substitute formula to match the programmed formula.

6. The method as recited in claim 1, wherein inferring the one or more substitute formulae includes searching a database for replacement formulas based on the subset of traces.

7. The method as recited in claim 1, further comprising verifying that the best matched substitute formula matches the programmed formula.

8. A hardware processing system configured to reduce computation complexity of a programmed formula stored in non-transitory storage media, comprising:
   a processor configured to generate a selection of traces for a programmed formula;
   an inferring device coupled to the processor to search for one or more substitute formulae from a plurality of stored formulae to determine a similar set of traces to the selection of traces; and
   a transformed program generated using the processor that matches the programmed formula with a best matched substitute formula to reduce computational complexity.

9. The system as recited in claim 8, wherein the traces includes a depth where larger depth provides greater detail for the traces.

10. The system as recited in claim 8, wherein the processor selects a subset of the traces based on a plurality of values of an iteration counter N.

11. The system as recited in claim 8, wherein the traces include a series of numbers or a group of numbers computed by the programmed formula.

12. The system as recited in claim 8, wherein the transformed program includes one or more additional mathematical operations on the best matched substitute formula to match the programmed formula.

13. The system as recited in claim 8, wherein the inferring device searches a database for replacement formulas based on the subset of traces.

14. The system as recited in claim 8, wherein the system verifies that the best matched substitute formula matches the programmed formula.

15. A non-transitory computer readable storage medium comprising a computer readable program for optimization of a formula in a program, wherein the computer readable program when executed on a computer causes the computer to perform the steps of:
generating traces for a programmed formula using a hardware processing system;
selecting a subset of the traces;
inferring one or more substitute formulae from a plurality of formulae that yields a similar set of traces to the subset of traces; and
transforming the program by replacing the programmed formula with a best matched substitute formula to reduce computational complexity.

16. The non-transitory computer readable storage medium as recited in claim 15, wherein generating traces includes generating traces at different depths where larger depth provides greater detail for the traces.

17. The non-transitory computer readable storage medium as recited in claim 15, wherein selecting the subset of the traces includes:
employing an iteration counter N; and
selecting the subset of traces based on a plurality of values of N.

18. The non-transitory computer readable storage medium as recited in claim 15, wherein inferring the one or more substitute formulae includes searching a database for replacement formulas based on the subset of traces.

19. The non-transitory computer readable storage medium as recited in claim 15, further comprising verifying that the best matched substitute formula matches the programmed formula.

20. The non-transitory computer readable storage medium as recited in claim 15, wherein transforming the programmed formula with the best matched substitute formula includes conducting one or more mathematical operations on the best matched substitute formula to match the programmed formula.

* * * * *